United States Patent [19]

Jost et al.

[11] Patent Number: 4,919,517

[45] Date of Patent: Apr. 24, 1990

[54] IMAGE-REPRODUCING ARRANGEMENT FOR MOTOR VEHICLES INCLUDING LENS MEANS FORMING A REAL IMAGE ADJACENT AN UPPER EDGE OF A WINDSHIELD TO WHICH AN INSTRUMENT PANEL MIRROR REFLECTS TO FORM A VIRTUAL IMAGE

[75] Inventors: Michael Jost, Unterschleissheim; Walter Weishaupt, Munich, both of Fed. Rep. of Germany

[73] Assignee: Bayerische Motoren Werke Aktiengesellschaft, Munich, Fed. Rep. of Germany

[21] Appl. No.: 258,852

[22] Filed: Oct. 17, 1988

[30] Foreign Application Priority Data

Oct. 16, 1987 [DE] Fed. Rep. of Germany ....... 3735124

[51] Int. Cl.$^5$ .................. G02B 27/10; G02B 17/08
[52] U.S. Cl. .................................. 350/174; 350/503; 350/504
[58] Field of Search ............... 350/174, 3.72, 3.70, 350/505, 504, 503

[56] References Cited

U.S. PATENT DOCUMENTS

| | | | |
|---|---|---|---|
| 3,887,273 | 6/1975 | Griffiths | 350/174 |
| 3,892,474 | 7/1975 | Nilsson | 350/174 |
| 3,945,716 | 3/1976 | Kinder | 350/174 |
| 4,132,022 | 1/1979 | Wood, Jr. | |
| 4,269,476 | 5/1981 | Gauthier et al. | 350/174 |
| 4,582,389 | 4/1986 | Wood et al. | |
| 4,600,271 | 7/1986 | Boyer et al. | 350/174 |

FOREIGN PATENT DOCUMENTS

| | | |
|---|---|---|
| 0177134 | 4/1986 | European Pat. Off. |
| 2304175 | 8/1973 | Fed. Rep. of Germany |
| 3523032 | 2/1986 | Fed. Rep. of Germany |
| 3532120 | 3/1987 | Fed. Rep. of Germany |
| 2578797 | 9/1986 | France |

OTHER PUBLICATIONS

Electronics, Sep. 29, 1977, pp. 41–42.
IBM Technical Disclosure Bulletin, vol. 10, No. 3, Aug. 1967, pp. 267–268.
Patents Abstracts of Japan, JP 60 131 328A, M–431, Nov. 20, 1985, vol. 9, No. 294.

*Primary Examiner*—Jon W. Henry
*Attorney, Agent, or Firm*—Barnes & Thornburg

[57] ABSTRACT

An image-reproducing arrangement for motor vehicles, in which a real image is represented as virtual image in the field of vision of the vehicle user by means of a lens and the windshield following the lens in the path of the light rays; the real image and the lens are thereby arranged at the upper edge of the windshield. Only a mirror element is located between the lens and the windshield within the area of the surface of the instrument panel. This mirror element requires a relatively small amount of space and by reason of the relatively large distance from the lens element offers the possibility to match the virtual image falling into the eye of the vehicle user to the respective prevailing conditions.

19 Claims, 1 Drawing Sheet

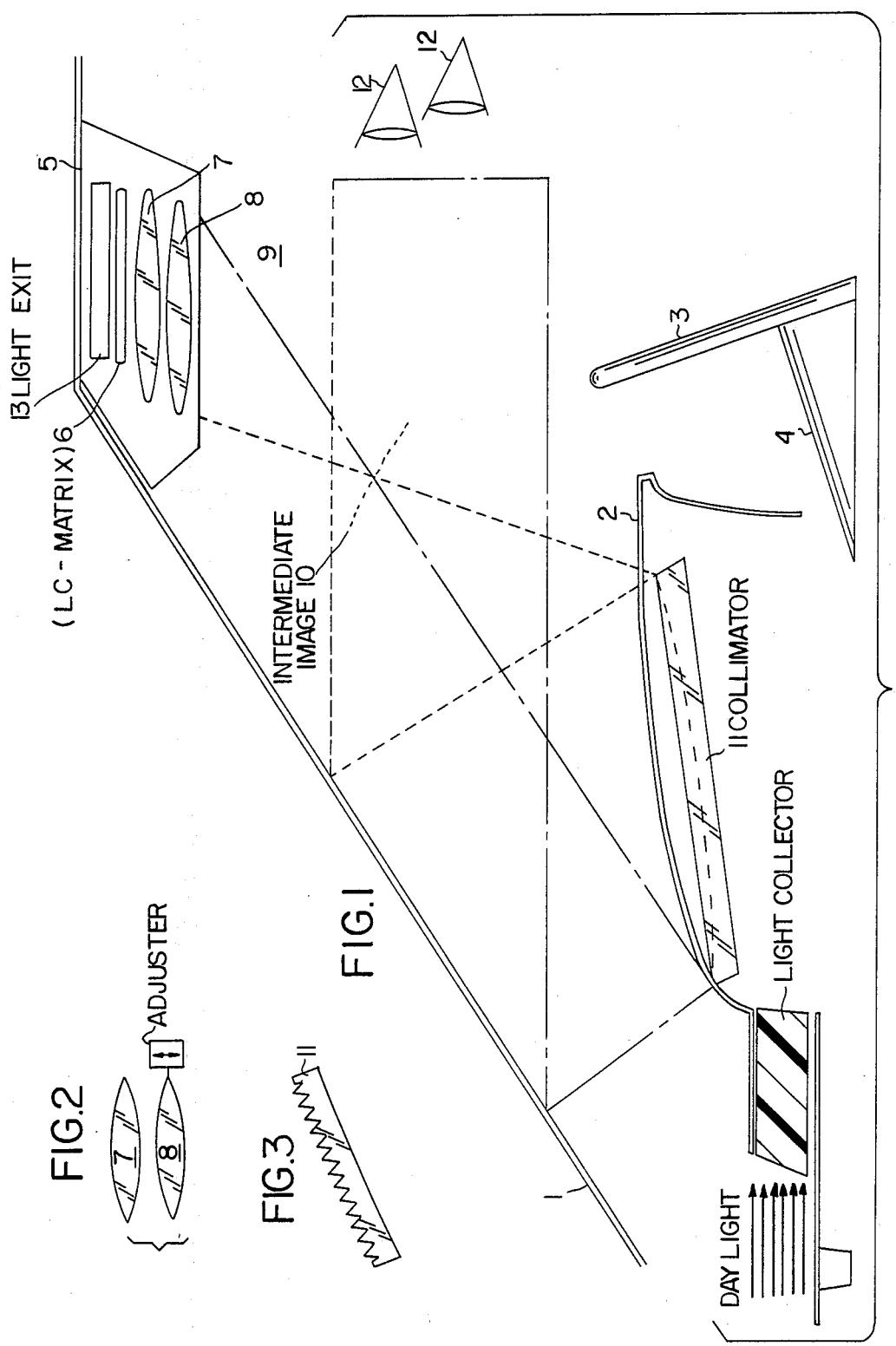

IMAGE-REPRODUCING ARRANGEMENT FOR MOTOR VEHICLES INCLUDING LENS MEANS FORMING A REAL IMAGE ADJACENT AN UPPER EDGE OF A WINDSHIELD TO WHICH AN INSTRUMENT PANEL MIRROR REFLECTS TO FORM A VIRTUAL IMAGE

BACKGROUND AND SUMMARY OF THE INVENTION

The present invention relates to an image reproducing or display arrangement for motor vehicles in which a rear image is reproduced as virtual image in the field of vision of the vehicle user by means of a lens and the windshield following in the path of the light rays.

Such arrangements, which are also known under the designation "Head-Up Display" are known, for example, from the EP No. 216 014 A and the DE No. 35 32 120 A. In these prior art arrangements, the generator for the real image and the lens are located within the area of the instrument panel. By reason of the spatially constricted installation conditions, this leads to considerable constructive problems. The latter are made more difficult if it becomes necessary to provide additional devices for the adaptation of the virtual image to the respective vehicle users or for the change of the intercept or image distance of this image located preferably at a large distance in front of the motor vehicle.

The present invention is concerned with the task to provide an image reproducing or display arrangement of the aforementioned type which can be accommodated in a constructively simple manner with smallest possible space requirement within the area of the instrument panel inside of the motor vehicle.

The underlying problems are solved by the present invention in that the real image and the lens are located at the upper edge of the windshield and in that a mirror is arranged between the lens and the windshield within the area of the surface of the instrument panel.

Within the area of the instrument panel, only the mirror is now provided which, for example, can be constructed as flat or plane body of slight thickness. Additionally, it is possible to minimize the space requirement of the mirror by its construction as holographic optical element—in this case the space requirement corresponds to that of a thin film—or as Fresnel mirror. The shape of a mirror element constructed in this manner can then be matched to the surface of the instrument panel and, for example, can then rest directly on the same.

The accommodation of the producer or generator for the real image and of the lens in the upper area of the windshield offers the advantage to be able to dispose over a relatively large installation space which heretofore has been used at most only for a sun visor. The possibility can also eventually be realized in this installation space to change the virtual image in the mentioned manner.

A further improvement of the present invention is achieved in that the mirror is constructed as collimator. It becomes possibly thereby, especially in conjunction with the lens, to produce a virtual image which lies at some distance in front of the vehicle and possibly even at infinity. An accommodation of the human eye is dispensed with thereby because the virtual image lies in a distance range in which the vehicle user watches the traffic.

Such a collimator mirror can also be constructed in the form of a holographic optical element or of a Fresnel mirror. The latter, analogous to the known Fresnel lens, is formed by ring-shaped partial sections which in cross section adjoin one another step-like.

For example, a liquid crystal (LCD) indicating device may serve as image producer or generator. Such an arrangement distinguishes itself by a small space requirement. It offers additionally the possibility to supply a variable light intensity with the aid of a secondary light source placed underneath the same. The light intensity can be matched to the outside brightness in order to realize always a sufficient contrast. For that purpose, the outside brightness can be determined with the aid of a known photodiode and can be converted into a corresponding control signal for the brightness adjustment of the secondary light source.

In the alternative thereto, the LCD illumination can also take place during the day by means of daylight which is picked up by a light collector and is conductor to the LCD by way of a light conductor.

The already mentioned means for the variation of the position or image distance of the virtual image can be realized in a constructively particularly simple manner with the aid of two convex lens elements which are adjustable in their mutual distance. The real image is thereby located in the focal plane of the first lens element as viewed in the beam path. Also, such lens elements can be constructed again as holographic optical elements or Fresnel lenses. By the variation of the mutual spacing of the two lenses from one another, the real intermediate image produced by the second lens is changed in its distance from the collimator. A change of the virtual image visible by the vehicle user also results therefrom as regards its size, respectively, its distance.

This representation of the virtual image at the distance and the means for the variation of the distance can be achieved constructively in a particularly advantageous and cost-favorable manner in that the image is produced by means of a liquid crystal film and/or by the use of a lens element including convex lenses, respectively, holographic optical elements changeable in their mutual spacing whereby the real image is in the focal plane of the first lens, respectively, of the first holographic optical element.

BRIEF DESCRIPTION OF THE DRAWING

These and other objects, features and advantages of the present invention will become more apparent from the following description when taken in connection with the accompanying drawing which shows, for purposes of illustration only, one embodiment in accordance with the present invention, and wherein:

FIG. 1 is a cross-sectional view of a portion of the front part of the interior space of a motor vehicle containing one embodiment of an image display arrangement in accordance with the present invention FIG. 2 is a schematic showing of adjusting means for changing the distance between the lens; and FIG. 3 shows the mirror 11 as a Fresnel mirror.

DETAILED DESCRIPTION OF THE DRAWINGS

Referring now to the single figure of the drawing, the front part of the interior space of the motor vehicle illustrated therein includes a windshield 1, an instrument panel 2 as well as a steering wheel 3 with a steering column 4.

An image producer or generator 6 in the form of a liquid crystal matrix for a real image as well as a lens generally designated by reference numeral 9 and consisting of two convex lens elements 7 and 8 arranged one behind the other are located in the transition area of the windshield 1 to the roof 5. A light source 13 is located behind the image producer or generator 6, which is controlled corresponding to the outside brightness.

The image producer or generator 6 is located in the focal plane of the first lens element 7. By reason of the optical reproducing properties, the lens element produces of each image point of the image producer or generator 6 a parallel ray beam limited only by the dimensions of the lens element 7.

These ray beams are reproduced by the lens element 8 in the focal plane thereof as intermediate image 10. The intermediate image 10 reaches the eye 12 of a vehicle user by way of a concave mirror 11 and the windshield 1.

A glare-free operation can be assured in any appropriate manner, for example, with the aid of a coated surface, for instance, a λ/4-anti-reflection coating, and such coated surface can then be permeable only for the light emitted by the image producer or generator 6. In case of a plane windshield 1 the mirror 11 alone, and in case of an arcuately shaped windshield 1, the windshield 1 in conjunction with the mirror 11 assure that the light reflected by the windshield 1 and directed toward the vehicle user is aligned far-reachingly parallel corresponding to the desired virtual distance. It is therewith possible corresponding to the optical reproducing properties to let the intermediate image appear at a distance which corresponds at least approximately to the actual distance of the field of vision determinative for the vehicle user. It thereby involves a distance of, for example, 15 to 20 m. in front of the motor vehicle, respectively, at infinity.

By varying the distance of the lens element 8 from the lens element 7, it becomes possible to displace the intermediate image 10 in the direction of the concave mirror 11 and therewith to reduce the size thereof in the eye 12 of the motor vehicle user. It can be achieved by the inclined position of the intermediate image 10 with respect to the optical axis of the concave mirror reflector 11 that the virtual distance of the reproduction increases at the location of the observer in dependence on the height, as a result of which the spatial impression is emphasized.

By the arrangement of the image generator or producer 6 and of the lens elements 7 and 8 at the upper edge of the windshield 1, the elements essential for the image reproducing or display arrangement can be accommodated within an area which is otherwise far-reachingly non-utilized. Thereabeyond, owing to the relatively large distance to the windshield 1, the formed virtual image can be matched within wide limits to the prevailing conditions both as regards the motor vehicle as also as regards the vehicle user. The space requirement within the area of the instrument panel 2 is limited exclusively to that of the mirror 11 and can be kept particularly small by an appropriate selection, respectively, adaptation of this mirror, for example, by its construction in the form of a holographic optical element. Such an element can be matched in its contour to the surface of the instrument panel 2 and, for example, can rest on the same. At the same time, an interfering reflection by outside light by way of this mirror 11 into the eye of the observer is avoided by a corresponding color emphasis, respectively, coating. The possible adaptation of the light intensity of the image 6 with the aid of the light generator of the light source 13 therebeyond offers the assurance that the virtual image in the eye of the observer 12 always exceeds the brightness of the outside light and thus can be noticed practically in every case.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An image-reproducing arrangement for motor vehicles with a windshield and an instrument panel, in which a real image is represented as a virtual image in the field of vision of a vehicle user, comprised of lens means forming said real image, the real image and the lens being located adjacent the upper edge of the windshield, and mirror means for reflecting the real image to the windshield to provide said virtual image, said mirror means being arranged within an area of a surface of the vehicle's instrument panel between the lens means and the windshield.

2. An image-reproducing arrangement according to claim 1, wherein the mirror means collimates the light from the real image.

3. An image-reproducing arrangement according to claim 1, wherein the mirror means is constructed as concave reflector.

4. An image-reproducing arrangement according to claim 1, wherein the mirror means is a holographic optical element.

5. An image-reproducing arrangement according to claim 1, wherein the mirror means is a Fresnel mirror.

6. An image-reproducing arrangement according to claim 1, wherein the image is produced by a liquid crystal film.

7. An image-reproducing arrangement according to claim 1, wherein the lens means includes optical elements with means to vary their respective mutual spacing, and wherein the real image is located in the focal plane of one of the optical elements.

8. A image-reproducing arrangement according to claim 7, wherein the optical elements are convex lenses.

9. A image-reproducing arrangement according to claim 7, wherein the optical elements are holographic optical elements.

10. An image-reproducing arrangement according to claim 2, wherein the mirror means is constructed as concave reflector.

11. An image-reproducing arrangement according to claim 2, wherein the mirror means is a holographic optical element.

12. An image-reproducing arrangement according to claim 2, wherein the mirror means is a Fresnel mirror.

13. An image-reproducing arrangement according to claim 7, wherein the image is produced by a liquid crystal film.

14. An image-reproducing arrangement according to claim 13, wherein the mirror means collimates the light from the real image.

15. An image-reproducing arrangement according to claim 14, wherein the mirror means is constructed as concave reflector.

16. An image-reproducing arrangement according to claim 15, wherein the mirror means is a holographic optical element.

17. An image-reproducing arrangement according to claim 15, wherein the mirror means is a Fresnel mirror.

18. An image-reproducing arrangement according to claim 14, wherein the optical elements are convex lenses.

19. An image-reproducing arrangement according to claim 14, wherein the optical elements are holographic optical elements.

* * * * *